(12) United States Patent
Zhang et al.

(10) Patent No.: US 8,578,384 B2
(45) Date of Patent: Nov. 5, 2013

(54) METHOD AND APPARATUS FOR ACTIVATING SYSTEM COMPONENTS

(75) Inventors: Shayan Zhang, Austin, TX (US);
William C. Moyer, Dripping Springs, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 886 days.

(21) Appl. No.: 12/607,562

(22) Filed: Oct. 28, 2009

(65) Prior Publication Data

US 2011/0099402 A1 Apr. 28, 2011

(51) Int. Cl.
*G06F 9/46* (2006.01)
*G06F 1/00* (2006.01)

(52) U.S. Cl.
USPC ........... 718/103; 718/102; 713/320; 713/323; 713/324

(58) Field of Classification Search
USPC ................. 718/1–105, 108; 713/300–340
See application file for complete search history.

(56) References Cited

U.S. PATENT DOCUMENTS

| | | | | |
|---|---|---|---|---|
| 5,361,392 A * | 11/1994 | Fourcroy et al. | | 713/310 |
| 5,517,186 A * | 5/1996 | Veenstra | | 326/39 |
| 7,137,117 B2 * | 11/2006 | Ginsberg | | 718/102 |
| 7,191,349 B2 * | 3/2007 | Kaushik et al. | | 713/323 |
| 7,689,838 B2 * | 3/2010 | Srinivasan et al. | | 713/300 |
| 7,904,658 B2 * | 3/2011 | Abadeer et al. | | 711/128 |
| 8,027,707 B2 * | 9/2011 | Lu | | 455/574 |
| 8,156,275 B2 * | 4/2012 | De Cesare et al. | | 710/200 |
| 2003/0172310 A1 * | 9/2003 | Moyer et al. | | 713/300 |
| 2005/0273633 A1 * | 12/2005 | Wilcox et al. | | 713/300 |
| 2006/0156306 A1 * | 7/2006 | Di Gregorio et al. | | 718/102 |
| 2007/0192641 A1 * | 8/2007 | Nagendra et al. | | 713/320 |
| 2007/0290727 A1 * | 12/2007 | Jarosinski et al. | | 327/161 |
| 2008/0109669 A1 * | 5/2008 | Kim | | 713/323 |
| 2008/0155549 A1 | 6/2008 | Blinick et al. | | |
| 2008/0235529 A1 | 9/2008 | Sugita | | |
| 2009/0177907 A1 * | 7/2009 | Sotomayor et al. | | 713/340 |
| 2009/0249094 A1 * | 10/2009 | Marshall et al. | | 713/320 |
| 2010/0146312 A1 * | 6/2010 | Liao | | 713/310 |

OTHER PUBLICATIONS

Ricardo Bianchini, Ram Rajamony; Power and Energy Management for Server Systems; IEEE 2004, pp. 68-76.*
Bhadauria, Major et al.; "Data Cache Techniques to Save Power and Deliver High Performance in Embedded Systems"; Transactions on High Performance Embedded Architectures and Compilers (HiPEAC); 2007; pp. 62-81; vol. 2, No. 1.
Bhadauria, Major et al.; "A Precisely Tunable Drowsy Cache Management Mechanism"; Proc. Watson Conference on Interaction Between Architecture, Circuits and Compilers, Yorktown Heights, NY; Oct. 2006; 10 pgs.

* cited by examiner

*Primary Examiner* — Abdullah Al Kawsar
(74) *Attorney, Agent, or Firm* — Joanna G. Chiu (57) ABSTRACT

A selected thread is scheduled to run on a corresponding master of a multiple threaded processing system. When the priority of the selected thread is high, the selected thread is run on the corresponding master. When the priority of the selected thread is low and the corresponding master is in an operational mode, the selected thread is run on the corresponding master. When the priority of the selected thread is low and the corresponding master is in a low power mode, the selected thread is selectively run on the corresponding master based on an amount of time that the corresponding master has been in the low power mode since its most recent entrance into the low power mode.

9 Claims, 4 Drawing Sheets

METHOD AND APPARATUS FOR ACTIVATING SYSTEM COMPONENTS

BACKGROUND

1. Field

This disclosure relates generally to semiconductors, and more specifically, to power usage in semiconductor processors.

2. Related Art

Lower power consumption continues to have importance in data processing systems, due, for example, to widespread use of portable and handheld applications. Most data processing systems today use a smaller, faster, and more efficient memory, referred to as a cache, located on the integrated circuit to reduce the number of accesses to memory (such as main memory or other internal or external memories). It is well known that accesses to cache generally consume less power and result in reduced latencies as compared to accesses to other internal or external memories. Therefore, it is desirable to store those items which will subsequently be requested again in the faster, more efficient cache in order to reduce power and increase performance. Other power conservation techniques are typically utilized in data processing systems. For example, after selected portions of a data processing system have remained idle for a certain amount of time, the power to the selected portions is either reduced or removed. Data processing systems that have multiple cores also implement power conservation by powering down selected cores after periods of inactivity.

Many modern processing systems schedule and execute multiple threads. A "thread" is a series of self-contained instructions that perform an operation, wherein the instructions may be executed concurrently and independently with other threads. Others have scheduled the execution of multiple threads based on a priority basis. Thread schedulers may use timers to determine when a currently executing thread should be preempted by a higher priority thread. Some thread executions also get delayed as a result of needing to wait upon completion of another operation. While waiting, the thread may not have sufficient priority to continue to be executed and therefore be placed on hold in a waiting queue. However, quick transitioning between an active operation and an on-hold operation of a thread can cause greater dissipation of power than if the processing device had completed operation of the thread without having any waiting period. Others have caused a thread to remain inactive for at least a predetermined amount of time as a result. However, in multiple core systems with various types of processing devices, the fixed inactive time causes system inefficiency.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
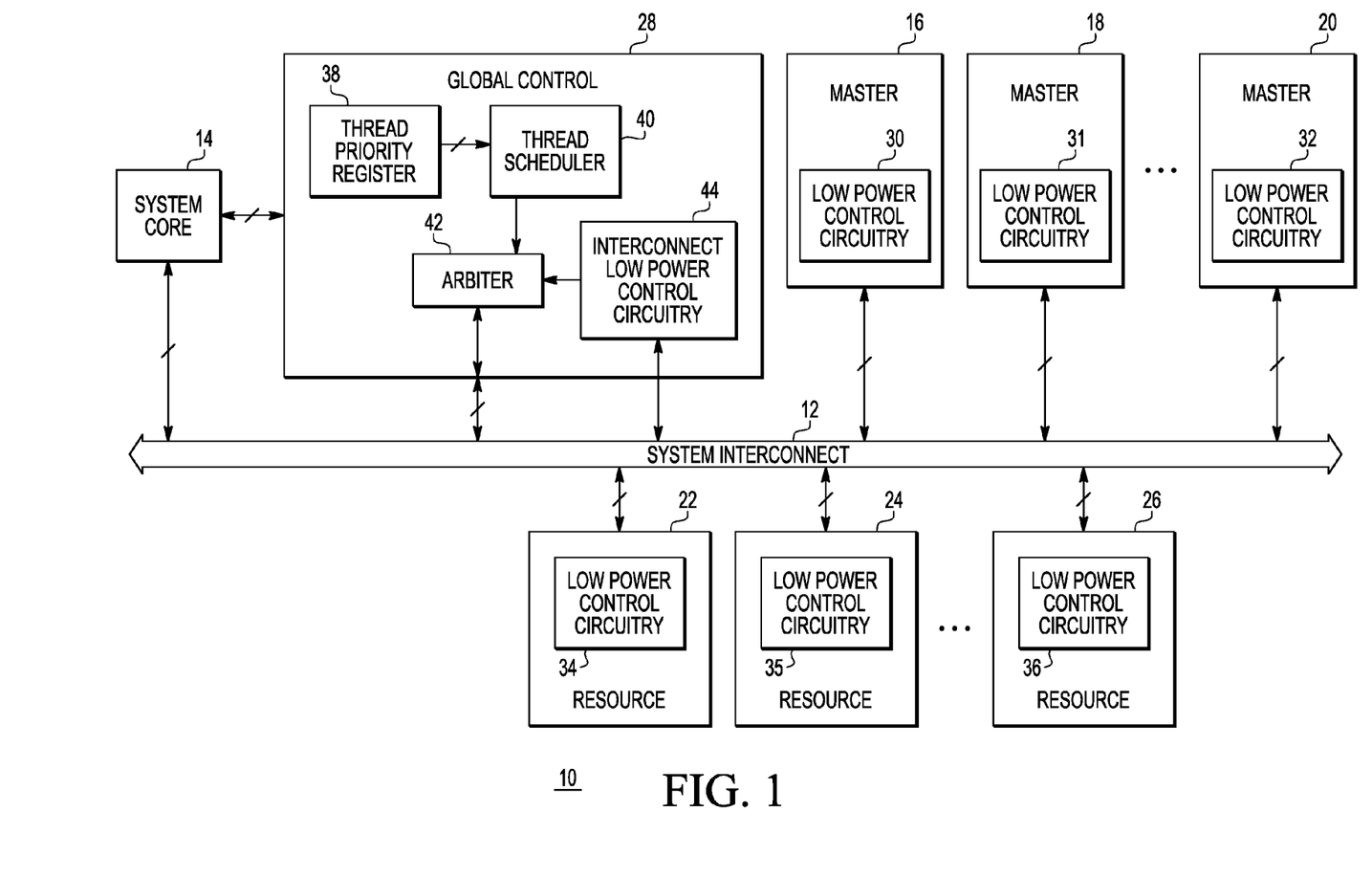
FIG. 1 illustrates in block diagram form an exemplary multiple thread data processing system for using one form of the present invention.

In one embodiment FIG. 1 illustrates one form of a multiple (multi) threaded processing system 10. A system interconnect 12 is used as a communication medium to permit communication of information between various components or modules of the multiple threaded processing system 10. The system interconnect 12 may be implemented as a multiple conductor bus, a crossbar switch or other conventional interconnect structures. Coupled to the system interconnect 12 via a bidirectional multiple bit conductor is a system core 14. In one form the system core 14 is a data processor or a control processor. Also coupled to the system interconnect 12 via bidirectional conductors are a master 16, a master 18, a master 20, a resource 22, a resource 24 and a resource 26. Any number of master devices may be coupled to the system interconnect 12, and any number of resources may be coupled to the system interconnect 12. Examples of possible implementations of a master device include a processor, a core or a controller. Examples of possible implementations of a resource include a memory or other storage device, a display, a keyboard, a graphic accelerator or other input/output (I/O) devices. A global control 28 is bidirectionally coupled to both the system core 14 and the system interconnect 12. Relevant portions of the global control 28 illustrated in FIG. 1 include a thread priority register 38, a thread scheduler 40, an arbiter 42 and interconnect low power control circuitry 44. An output of the thread priority register 38 is coupled to an input of the thread scheduler 40 via a multiple bit conductor. An output of the thread scheduler 40 is connected to a first input of arbiter 42. An output of the interconnect low power control circuitry 44 is connected to a second input of arbiter 42. An input/output of arbiter 42 is connected to the system interconnect 12. An input/output of the interconnect low power control circuitry 44 is connected to the system interconnect 12.

In operation, the multiple threaded processing system 10 has multiple masters that are processing concurrently and which all use the system interconnect 12 under control of the arbiter 42. The arbiter 42 uses any of a plurality of conventional arbitration protocols to determine which master among masters 16, 18 and 20 is given access to the system interconnect 12. Each master and each resource may be placed from a normal power mode of operation to a low power mode of operation by its respective low power control circuitry, such as low power control circuitry 30 for master 16. The interconnect low power control circuitry 44 within the global control 28 functions to determine when the system interconnect 12 is placed in a low power mode of operation. A low power mode of operation for the system interconnect 12 is implemented by reducing a power supply voltage to various circuitry including logic gates and control circuits that form the functionality of the system interconnect 12.

As used herein, a low power mode of operation is a mode in which operational voltage and/or operating current is reduced and power is saved. The operational voltage may be any voltage use by the component during its operation. The amount of operational voltage reduction may vary from all power being removed from the circuitry entering the lower power mode to only a portion of the normal operational voltage being reduced. Thus the amount of power reduction that occurs from the low power mode of operation is application-specific and may differ between some or all of the masters, the resources and the system interconnect, as well as being uniform for all of these components.

When the system interconnect 12 is in a low power mode, power is removed from logic components (not shown) which are present within the system interconnect 12 when the system interconnect 12 is not implemented as only a bus. The interconnect low power control circuitry 44 also indicates to the arbiter 42 that the system interconnect is to enter a low power mode. The thread priority register 38 is programmable by the system core 14 and stores a priority value for each of the currently executing threads. The system core 14 executes a program in a predetermined operating system which determines the prioritization. Various levels of priority may be implemented including simply a high priority or a low priority. In one form a priority is high if the priority reaches or exceeds a priority threshold. Otherwise, the priority is considered to be a low priority. Generally, a priority system is implemented so that no two components will have exactly the same priority value. If identical priority values exist, a default selection policy is implemented to resolve the priority conflict. Based upon the priority value stored in the thread priority register 38, the thread scheduler 40 determines a schedule for an order of execution of all pending threads. Based upon the thread schedule, the thread scheduler 40 provides a control signal to arbiter 42 as to which thread or threads and thus which master or masters and which resource or resources to grant access to the system interconnect 12.

Figure 2:
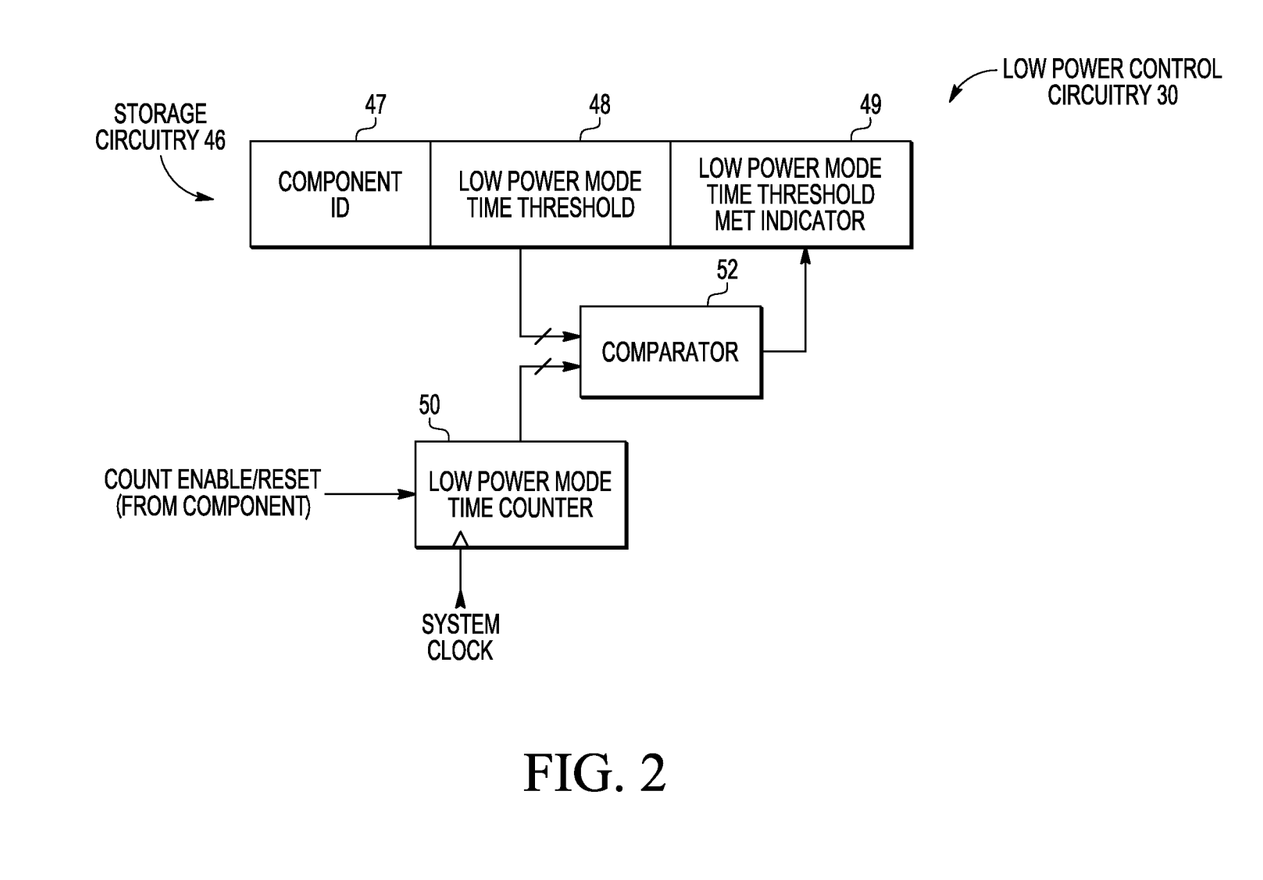
FIG. 2 illustrates in block diagram form one form of low power control circuitry of FIG. 1 in accordance with the present invention.

Illustrated in FIG. 2 is further detail of an exemplary form of the low power control circuitry 30 of master 16. Similar circuitry may be used for each of the low power control circuitry 31-36 and the interconnect low power control circuitry 44. The low power control circuitry 30 has storage circuitry 46 having a register with distinct fields. Other storage devices besides a register may be used. The storage circuitry 46 has a component identification (ID) field 47 which defines the specific component. Storage circuitry 46 also has a low power mode time threshold field 48 for storing a dynamically alterable time for the identified component in which the component must stay in a low power mode once it has entered the low power mode. Storage circuitry 46 also has a low power mode time threshold met indicator field 49 which stores a value which indicates whether the time threshold specified in the low power mode time threshold field 48 has been met or exceeded. A low power mode time counter 50 has an enable/reset input that is coupled to the component or in this case master 16. The master 16 generates the reset signal to clear the value of the low power mode time counter 50 to zero every time the thread starts on master 16. The master 16 generates the enable signal to start the low power mode time counter 50 every time the master 16 completes a last operation of a thread. In this way the low power mode time counter 50 alternates between enabling the count function and a reset of the count value. The low power mode time counter 50 has a clock input for receiving a system clock which is specified to have a desired frequency in order for the multiple thread processing system to attain a predetermined performance level. The system clock is generated by clock control circuitry (not shown) within the multiple threaded processing system 10. An output of the low power mode time counter 50 is connected to a first input of a comparator 52. The value in the low power mode time threshold field 48 is connected to a second input of the comparator 52. An output of the comparator 52 provides the low power mode time threshold met indicator that is connected to the low power mode time threshold met indicator field 49 for storage in the low power mode time threshold met indicator field 49. It is desirable for a master and/or a resource to remain in its low power mode for a minimum amount of time for low priority threads to ensure that the amount of energy saved by entering low power mode exceeds the overhead energy expended in transitioning into and out of a low power mode. The minimum amount of time of a system component remaining in low power mode can be component (master or resource) specific. To achieve optimum overall power saving results, each control circuit within the multiple threaded processing system 10 functions to have a programmable value in the low power mode time threshold field 48 for the associated identified component. This value represents a minimum amount of time that the component must stay in the low power mode before the component is allowed to come out of the low power mode. Because each component has a unique ID value and its own low power mode time threshold field 48, different time thresholds may be implemented for different masters and different resources. Thus a user is able to customize the amount of minimum time to require in low power mode for each component to optimize power conservation. For example, a master that is a core may have a shorter minimum time to remain in the low power mode than a resource such as a memory. Rather than to require all components to remain in a low power mode for a uniform fixed amount of time, the power savings may be customized to optimize power efficiency.

The minimum time to remain in a low power mode may be determined by testing each master and resource in multiple threaded processing system 10 and measure the amount of consumed power as a function of leakage current consumed as a function of the number of data processing cycles executed at a predetermined frequency of operation. These measurements may be used to then customize for each type of master and resource what the optimum minimum time to remain in a low power mode should be. For example, for a cache memory, the factors of cache bank size which determines a composite leakage current, a frequency of operation and a target low power voltage value can be used to determine the minimum time to remain in the low power mode. The desired optimum value for the minimum time that a particular system component should remain in the low power mode also involves a tradeoff between conserved power for the system and an amount of time required to execute low priority threads. Because the minimum time value is dynamically programmable, great flexibility exists to modify the minimum time value based upon selected operating parameters, such as frequency of operation and supply voltage value. For example, as the voltage supplied by a battery used to power the multiple threaded processing system 10 decreases, the minimum time value may be modified dynamically. Also, the minimum time value may be set to target a desired minimum number of hours of operation of battery life associated with a battery that is used to power the multiple threaded processing system 10.

The comparator 52 compares the programmed low power mode time threshold field 48 with the count value of the low power mode time counter 50. In one form, when the count value of the low power mode time counter 50 is equal to or less than the value in the low power mode time threshold field 48, comparator 52 will provide a logic zero output. When the count value of the low power mode time counter 50 exceeds the value in the low power mode time threshold field 48, comparator 52 will provide a logic one output indicating that the low power mode time threshold has been met.

Figure 3:
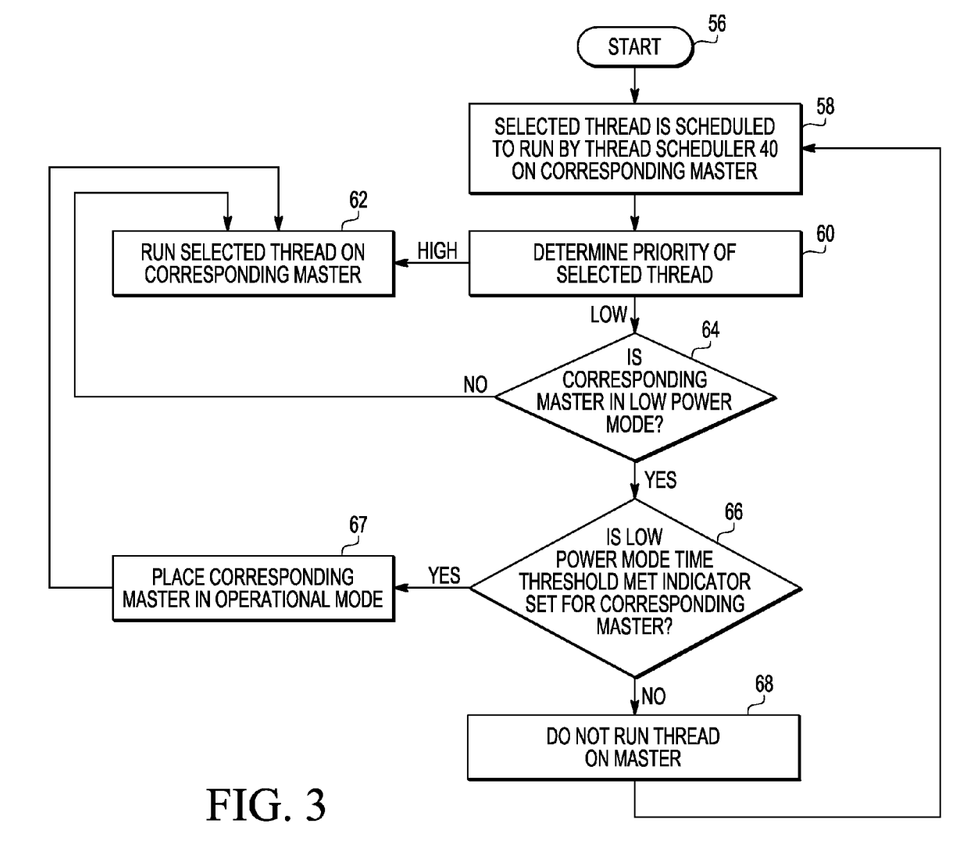
FIG. 3 illustrates in flow chart form a method of reducing power in a multiple thread processing system in accordance with the present invention.

Illustrated in FIG. 3 is one form of an exemplary method for activating system components in a multiple threaded processing system. After a start step 56, a selected thread is scheduled to run by the thread scheduler 40 on a corresponding master in a step 58. In a step 60, the priority of the selected thread is determined. If the priority of the selected thread is sufficiently high to be given priority by the arbiter 42 to have access to the system interconnect 12 and thus be run, a step 62 is performed. In step 62 the selected thread is run on the corresponding master. If the priority of the selected thread is not high enough to be given priority by the arbiter 42 to have access to the system interconnect 12, a low priority status results and a step 64 is run. In step 64 a determination is made whether the corresponding master is in low power mode. If the corresponding master is not in a low power mode, step 62 is performed at a next opportunity when the arbiter 42 has recognized the low priority selected thread. If in step 64 a determination is made that the corresponding master is in low power mode, a step 66 is performed in which a determination is made whether the low power mode time threshold met indicator is set for the corresponding master. If the determination answer is "yes", a step 67 is implemented in which the corresponding master is placed in operational mode. After step 67 is performed, the step 62 is performed in which the selected thread is run on the corresponding master. If the determination answer in step 66 is "no", a step 68 is performed in which the thread is not run on the corresponding master. Once this determination is made, another selected thread is scheduled to be run in step 58 and the process repeats as long as there are threads to execute. Thus the method illustrated in FIG. 3 uses the combination of priority information and a low power mode time threshold indicator for an individual component in a processing system to efficiently save power.

Figure 4:
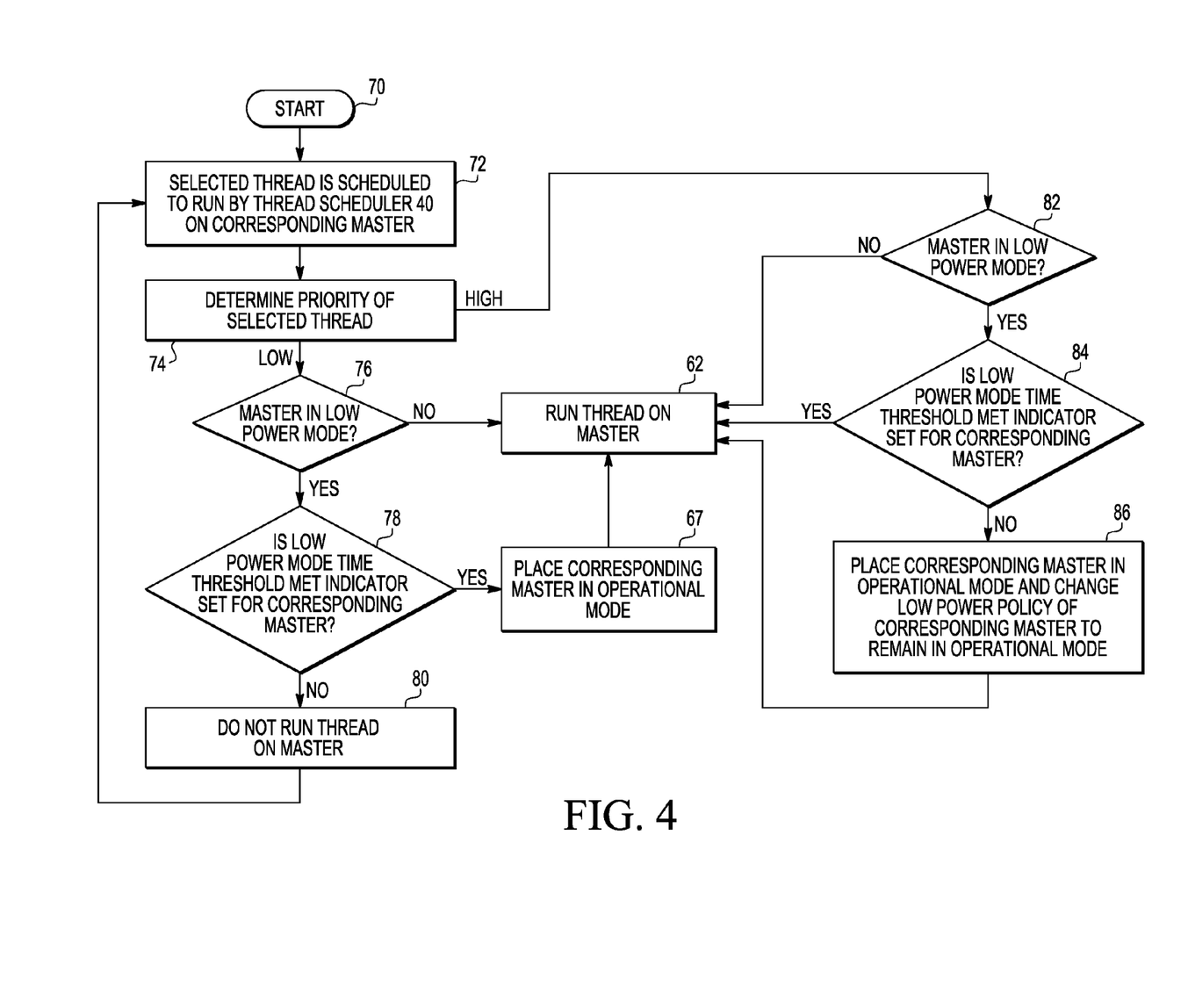
FIG. 4 illustrates in flow chart form another method of reducing power in a multiple thread processing system in accordance with the present invention.

Illustrated in FIG. 4 is another form of an exemplary method for activating system components in a multiple threaded processing system. After a start step 70, a step 72 is performed in which a selected thread is scheduled to run by the thread scheduler 40 on a corresponding identified master. Step 72 is followed by a step 74 in which priority of the selected thread is determined. If the priority is low (i.e. low enough that the arbiter 42 will not immediately grant system interconnect 12 access), a step 76 is performed. In step 76 a determination is made whether the master is in a low power mode. If the master is not in the low power mode, the thread is run on the master on step 77.

Continuing on FIG. 4, if a determination is made in step 78 that the master is in the low power mode, a step 78 is entered. A determination is made in step 78 regarding whether the low power mode time threshold met indicator has been set (i.e. set to indicate that the threshold time has been met) for the corresponding master. If the low power mode time threshold met indicator is not yet set affirmatively, a step 80 is performed in which the thread on the master is not run. A return from step 80 to step 72 is performed. If the low power mode time threshold met indicator has been set indicating that the time threshold has been reached, a step 79 is performed. In step 79 the corresponding master is placed in operational mode and brought out of the low power mode. Once the corresponding master is in its operational mode, the thread is run on the master in a step 77.

Continuing to refer to FIG. 4, if the priority of the selected thread is determined to be a high priority in step 74, a determination is made in step 82 whether the master is in a low power mode. If the master is not in its low power mode, the thread is run on the master in a step 77. If the master is determined in step 82 to be in the low power mode, a determination step 84 is performed. In step 84 a determination is made whether the low power mode time threshold met indicator is set for the corresponding master. If the required time has passed and the low power mode time threshold met indicator is set, the thread is run on the master in step 77. If the required time has not passed and the low power mode time threshold met indicator is not set, the corresponding master is nonetheless placed in operational mode and the low power policy of the corresponding master is changed so that the corresponding master remains in the operational mode in a step 86 (e.g. a master is automatically entering its low power mode after completion of an operation responding to a thread, its low power mode time counter 50 starts to run, and the amount of time stored in the low power mode time threshold field 48 of the low power control circuitry is changed). The functionality of step 86 permits a user to selectively quickly bring a corresponding master out of low power mode when a high priority thread is scheduled by the thread scheduler 40. Because of the access principle known as temporal locality, there is a probability that the corresponding master will subsequently be used by the scheduled high priority thread, the corresponding master is chosen to remain in the operational mode.

By now it should be appreciated that there has been provided a method and multiple threaded processing system for activating system components or circuitry from a low power mode of operation by using both a priority of execution of a thread and a programmable component-specific minimum low power mode time value. The disclosed system and method uses circuitry to dynamically track a system component's elapsed time in a low power mode from a last access or use of the system component. A comparison is made between the component's actual time in the low power mode and the programmable low power mode time value. Additionally, a storage device maintains a prioritization of a plurality of threads which are scheduled to be executed by the multiple threaded processing system. A delayed wakeup or activation policy for a system component is dependent upon the thread prioritization. For low priority threads, the component's actual time in the low power mode needs to have been met before the component will be brought out of the low power mode. For certain high priority threads, the component may nevertheless be brought out of the low power mode even when the actual time in the low power mode has not yet been attained.

Because the various apparatus implementing the present invention are, for the most part, composed of electronic components and circuits known to those skilled in the art, circuit details have not been explained in any greater extent than that considered necessary as illustrated above, for the understanding and appreciation of the underlying concepts of the present invention and in order not to obfuscate or distract from the teachings of the present invention. It should be understood that all circuitry described herein may be implemented either in silicon or another semiconductor material. During a manufacture process, the described circuitry may be instantiated by a software code representation of silicon or another semiconductor material.

In one form there is herein provided a method for activating a system component of a multi-threaded processing system. A selected thread is scheduled to run on a corresponding master of the multi-threaded processing system. A determination is made whether a priority of the selected thread is high or low, wherein the priority is high when the priority has a priority value greater than or equal to a priority threshold and the priority is low when the priority has a priority value less than the priority threshold. When the priority of the selected thread is low and the corresponding master is in a low power mode, a determination is made whether a low power mode time has met a time threshold. The low power mode time indicates an amount of time that the corresponding master has been in the low power mode since its most recent entrance into the low power mode. When the low power mode time has met the time threshold, the corresponding master is placed in an operational mode and the selected thread is run on the corresponding master. When the low power mode time has not met the time threshold, the corresponding master is maintained in the low power mode and the selected thread is not run on the corresponding master. In another form when the priority of the selected thread is high, the selected thread is run on the corresponding master. In another form when the priority of the selected thread is low and the corresponding master is in the operational mode, the selected thread is run on the corresponding master. In yet another form the corresponding master is operated according to a low power policy that causes the corresponding master to automatically enter the low power mode after completion of an operation of the corresponding master. In yet another form when the priority of the selected thread is high and the corresponding master is in the low power mode, the corresponding master is placed in the operational mode. The selected thread is run on the corresponding master. The low power policy of the corresponding master is updated such that the corresponding master remains in the operational mode after completion of an operation of the corresponding master. In another form a counter corresponding to the corresponding master is used to keep track of the low power mode time. In yet another form the time threshold is stored in user programmable storage circuitry.

In another form there is provided a method for activating a system component of a multi-threaded processing system wherein a selected thread is scheduled to run on a corresponding master of the multi-threaded processing system. A determination is made whether a priority of the selected thread is high or low, wherein the priority is high when the priority has a priority value greater than or equal to a priority threshold and the priority is low when the priority has a priority value less than the priority threshold. When the priority of the selected thread is high, the selected thread is run on the corresponding master. When the priority of the selected thread is low and the corresponding master is in an operational mode, the selected thread is run on the corresponding master. When the priority of the selected thread is low and the corresponding master is in a low power mode, the selected thread is selectively run on the corresponding master based on an amount of time that the corresponding master has been in the low power mode since its most recent entrance into the low power mode. In another form selectively running the selected thread includes determining whether the amount of time has met a time threshold. When the amount of time has met the time threshold, the corresponding master is placed in an operational mode and the selected thread is run on the corresponding master. When the amount of time has not met the time threshold, the corresponding master is maintained in the low power mode and the selected thread is not run on the corresponding master. In another form the corresponding master is operated according to a low power policy that causes the corresponding master to automatically enter the low power mode after completion of an operation of the corresponding master. In another form when the priority of the selected thread is high and when the corresponding master is in the low power mode, the corresponding master is placed in the operational mode prior to running the selected thread on the corresponding master. The low power policy of the corresponding master is updated such that the corresponding master remains in the operational mode after completion of an operation of the corresponding master. In another form the corresponding master is operated according to a low power policy that causes the corresponding master to automatically enter the low power mode after completion of an operation of the corresponding master. In yet another form when the priority of the selected thread is high and the corresponding master is in the low power mode, the corresponding master is placed in the operational mode prior to running the selected thread on the corresponding master. The low power policy of the corresponding master is updated such that the corresponding master remains in the operational mode after completion of an operation of the corresponding master. In another form a counter corresponding to the corresponding master is used to keep track of the amount of time.

In yet another form there is provided a multi-threaded processing system having a first master capable of operating in an operational mode and in a low power mode and having first low power control circuitry. The first low power control circuitry stores a first time threshold and keeps track of a first low power mode time which indicates an amount of time that the first master has been in the low power mode since its most recent entrance into the low power mode. A second master is capable of operating in the operational mode and in the low power mode and has second low power control circuitry. The second low power control circuitry stores a second time threshold and keeps track of a second low power mode time which indicates an amount of time that the second master has been in the low power mode since its most recent entrance into the low power mode. Control circuitry is coupled to the first master and the second master and has a thread scheduler. The thread scheduler schedules threads to be run in the multi-threaded processing system. Each scheduled thread is assigned one of the first master or the second master. A scheduled thread is selectively run on the assigned one of the first master or the second master based on a priority of the scheduled thread and one of the first low power mode time or the second low power mode time, based on whether the first master or the second master, respectively, is assigned to the scheduled thread. In another form when the priority of the scheduled thread is less than a priority threshold, the assigned one of the first master or the second master is operating in a low power mode, and the one of the first low power mode time or the second low power mode time meets one of the first time threshold or the second time threshold, respectively, the scheduled thread is run on the assigned one of the first master or the second master. When the priority of the scheduled thread is less than the priority threshold and the one of the first low power mode time or the second low power mode time does not meet one of the first time threshold or the second time threshold, respectively, the scheduled thread is not run on the assigned one of the first master or the second master. In another form the first time threshold has a different value than the second time threshold. In yet another form when the priority of the scheduled thread is greater than the priority threshold, the scheduled thread is run on the assigned one of the first master or the second master. In yet another form the assigned one of the first master or the second master operates according to a low power policy that causes the assigned one of the first master or the second master to automatically enter the low power mode after completion of an operation. When the priority of the scheduled thread is greater than the priority threshold, the low power policy of the assigned one of the first master or the second master is updated such that the assigned one of the first master or the second master remains in the operational mode after completion of an operation. In yet another form there is provided a system interconnect that is coupled to the first master and the second master. The system interconnect is capable of operating in the low power mode and has third low power control circuitry which stores a third time threshold and keeps track of a third low power mode time which indicates an amount of time that the system interconnect has been in the low power mode since its most recent entrance into the low power mode. A resource is coupled to the system interconnect and is accessible by at least one of the first master and the second master and is capable of operating in the low power mode. The resource has fourth low power control circuitry which stores a fourth time threshold and keeps track of a fourth low power mode time which indicates an amount of time that the resource has been in the low power mode since its most recent entrance into the low power mode.

Some of the above embodiments, as applicable, may be implemented using a variety of different information processing systems. For example, although FIG. 1 and the discussion thereof describe an exemplary data processing system, this exemplary system is presented merely to provide a useful reference in discussing various aspects of the invention. Of course, the description of the system has been simplified for purposes of discussion, and it is just one of many different types of appropriate systems that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Any computer readable media that is provided in the multiple threaded processing system may include, for example and without limitation, any number of the following: magnetic storage media including disk and tape storage media; optical storage media such as compact disk media (e.g., CD-ROM, CD-R, etc.) and digital video disk storage media; non-volatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

In one embodiment, the multiple threaded processing system 10 is implemented in any semiconductor independent of the type of semiconductor manufacturing process. Other embodiments may include any type of semiconductor bulk material. Any type of integrated circuit may be used in connection with the storage devices described herein.

Although the invention is described herein with reference to specific embodiments, various modifications and changes can be made without departing from the scope of the present invention as set forth in the claims below. For example, various types of storage devices may be used. Various functions may be implemented by the threads which are executed and any number of threads may be concurrently processed. Various types of comparison circuitry may be implemented and the discussed compare operation may be implemented in software. The physical location of the low power circuitry 30-36 and interconnect low power control circuitry 44 may be modified from that illustrated in FIG. 1 and may be centralized or partially centralized in a control module of the multiple threaded processing system 10. Various bus protocols and standards may be implemented by the system interconnect 12. In one form, the system interconnect 12 may be implemented as a plurality of conductors that is commonly referred to as a "bus". Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for activating a system component of a multiple threaded processing system, the method comprising:
   scheduling a selected thread to run on a corresponding master of the multiple threaded processing system;
   determining whether a priority of the selected thread is high or low, wherein the priority is high when the priority has a priority value greater than or equal to a priority threshold and the priority is low when the priority has a priority value less than the priority threshold; and
   when the priority of the selected thread is low and the corresponding master is in a low power mode, the method further comprises:
      determining whether a low power mode time has met a time threshold, wherein the low power mode time indicates an amount of time that the corresponding master has been in the low power mode since its most recent entrance into the low power mode;
      when the low power mode time has met the time threshold, placing the corresponding master in an operational mode and running the selected thread on the corresponding master; and
      when the low power mode time has not met the time threshold, maintaining the corresponding master in the low power mode and not running the selected thread on the corresponding master;
   when the priority, of the selected thread is high, running the selected thread on the corresponding master;

operating the corresponding master according to a low power policy that causes the corresponding master to automatically enter the low power mode after completion of an operation of the corresponding master; and when the priority of the selected thread is high and the corresponding master is in the low power mode, the method further comprises:

placing the corresponding master in the operational mode;

running the selected thread on the corresponding master; and updating the low power policy of the corresponding master to cause the corresponding master to remain in the operational mode after completion of the selected thread on the corresponding master.

2. The method of claim 1, further comprising:
when the priority of the selected thread is low and the corresponding master is in the operational mode, running the selected thread on the corresponding master.

3. The method of claim 1, further comprising:
using a counter corresponding to the corresponding master to keep track of the low power mode time, wherein the corresponding master resets the counter each time a thread begins on the corresponding master and enables the counter to start counting each time the corresponding master completes a last operation of a thread.

4. The method of claim 3, further comprising:
storing the time threshold in user programmable storage circuitry.

5. The method of claim 1, further comprising:
using a counter corresponding to the corresponding master to keep track of the amount of time, wherein the corresponding master resets the counter each time a thread begins on the corresponding master and enables the counter to start counting each time the corresponding master completes a last operation of a thread.

6. A method for activating a system component of a multiple threaded processing system, the method comprising:

scheduling a selected thread to run on a corresponding master of the multiple threaded processing system;

determining whether a priority of the selected thread is high or low, wherein the priority is high when the priority has a priority value greater than or equal to a priority threshold and the priority is low when the priority has a priority value less than the priority threshold;

when the priority of the selected thread is high, running the selected thread on the corresponding master;

when the priority of the selected thread is low and the corresponding master is in an operational mode, running the selected thread on the corresponding master;

when the priority of the selected thread is low and the corresponding master is in a low power mode, selectively running the selected thread on the corresponding master based on an amount of time that the corresponding master has been in the low power mode since its most recent entrance into the low power mode;

wherein the selectively running the selected thread when the priority of the selected thread is low and corresponding master is in low power mode comprises:

determining whether the amount of time has met a time threshold;

when the amount of time has met the time threshold, placing the corresponding master in the operational mode and running the selected thread on the corresponding master; and when the amount of time has not met the time threshold, maintaining the corresponding master in the low power mode and not running the selected thread on the corresponding master;

operating the corresponding master according to a low power policy that causes the corresponding master to automatically enter the low power mode after completion of an operation of the corresponding master; and when the priority of the selected thread is high, the method further comprises:

when the corresponding master is in the low power mode, placing the corresponding master in the operational mode prior to selectively running the selected thread on the corresponding master, running the selected thread on the corresponding master and updating the low power policy of the corresponding master to cause the corresponding master to remain in the operational mode after completion of the selected thread on the corresponding master.

7. A multiple threaded processing system, comprising:

a first master which operates in an operational mode and in a low power mode and has first low power control circuitry, the first low power control circuitry storing a first time threshold and keeping track of a first low power mode time which indicates an amount of time that the first master has been in the low power mode since its most recent entrance into the low power mode;

a second master which operates in the operational mode and in the low power mode and has second low power control circuitry, the second low power control circuitry storing a second time threshold and keeping track of a second low power mode time which indicates an amount of time that the second master has been in the low power mode since its most recent entrance into the low power mode; and control circuitry coupled to the first master and the second master and having a thread scheduler, the thread scheduler scheduling threads to be run in the multiple threaded processing system, each scheduled thread being assigned one of the first master or the second master, wherein a scheduled thread is selectively run on the assigned one of the first master or the second master based on a priority of the scheduled thread and one of the first low power mode time or the second low power mode time, based on whether the first master or the second master, respectively, is assigned to the scheduled thread;

wherein when the priority of the scheduled thread is less than a priority threshold, the assigned one of the first master or the second master is operating in a low power mode, and the one of the first low power mode time or the second low power mode time meets one of the first time threshold or the second time threshold, respectively, the scheduled thread is run on the assigned one of the first master or the second master by placing the assigned one of the first master or the second master in the operational mode, and when the priority of the scheduled thread is less than the priority threshold and the one of the first low power mode time or the second low power mode time does not meet one of the first time threshold or the second time threshold, respectively, the scheduled thread is not run on the assigned one of the first master or the second master;

wherein when the priority of the scheduled thread is greater than a priority threshold, the scheduled thread is run on the assigned one of the first master or the second master; and wherein the assigned one of the first master or the second master operates according to a low power policy that causes the assigned one of the first master or the second master to automatically enter the low power mode after completion of an operation, and when the priority of the scheduled thread is greater than the priority threshold and the assigned one of the first master or the second master is operating in a low power mode, placing the assigned first master or the second master in operational mode, running the scheduled thread on the assigned one of the first master or the second master and the low power policy of the assigned one of the first master or the second master is updated to cause the assigned one of the first master or the second master to remain in the operational mode after completion of the scheduled thread.

8. The multiple threaded processing system of claim 7, wherein the first time threshold has a different value than the second time threshold.

9. The multiple threaded processing system of claim 7, further comprising:
- a system interconnect coupled to the first master and the second master, the system interconnect operates in the low power mode and has third low power control circuitry which stores a third time threshold and keeps track of a third low power mode time which indicates an amount of time that the system interconnect has been in the low power mode since its most recent entrance into the low power mode; and
- a resource coupled to the system interconnect and accessible by at least one of the first master and the second master and which operates in the low power mode and has fourth low power control circuitry which stores a fourth time threshold and keeps track of a fourth low power mode time which indicates an amount of time that the resource has been in the low power mode since its most recent entrance into the low power mode.

* * * * *